United States Patent
Dawson et al.

(10) Patent No.: US 9,724,610 B2
(45) Date of Patent: *Aug. 8, 2017

(54) CREATION AND PRIORITIZATION OF MULTIPLE VIRTUAL UNIVERSE TELEPORTS IN RESPONSE TO AN EVENT

(71) Applicant: International Business Machines Corporation, Armonk, NY (US)

(72) Inventors: Christopher J. Dawson, Arlington, VA (US); Rick Allen Hamilton, II, Charlottesville, VA (US); Clifford A. Pickover, Yorktown Heights, NY (US); Robert Wisniewski, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 515 days.

This patent is subject to a terminal disclaimer.

(21) Appl. No.: 14/479,578

(22) Filed: Sep. 8, 2014

(65) Prior Publication Data

US 2014/0380196 A1 Dec. 25, 2014

Related U.S. Application Data

(63) Continuation of application No. 12/549,648, filed on Aug. 28, 2009, now Pat. No. 8,893,049.

(51) Int. Cl.
*G06F 3/00* (2006.01)
*A63F 13/60* (2014.01)
*G06F 3/0481* (2013.01)
*G06F 3/0482* (2013.01)
*H04L 29/06* (2006.01)
*A63F 13/30* (2014.01)

(52) U.S. Cl.
CPC .............. *A63F 13/60* (2014.09); *A63F 13/12* (2013.01); *G06F 3/0482* (2013.01); *G06F 3/04815* (2013.01); *H04L 67/38* (2013.01); *A63F 2300/5533* (2013.01)

(58) Field of Classification Search
None
See application file for complete search history.

(56) References Cited

U.S. PATENT DOCUMENTS 6,141,412 A * 10/2000 Smith ................. H04M 3/5158
 379/265.14
7,298,378 B1 * 11/2007 Hagenbuch ....... G06F 17/30061
 345/589
7,346,657 B2 3/2008 Miller et al.
2002/0019829 A1 2/2002 Shapiro
2006/0068812 A1 * 3/2006 Carro ................ H04M 1/72566
 455/456.3

(Continued)

*Primary Examiner* — Hua Lu
(74) *Attorney, Agent, or Firm* — Whitham, Curtis & Cook, PC; Maeve M. Carpenter (57) ABSTRACT

Useful work or services can be automated or otherwise facilitated or solutions to real world events developed by emulation of a real-world environment (which can contain objects representing virtual objects) with a virtual environment and generating a prioritized sequence of locations and associated tasks in accordance with resources related to the event in a virtual universe. Performance of the prioritized tasks at the prioritized locations is facilitated in the virtual universe by locally generating teleportation invitations corresponding to locations in the ordered sequence of locations.

20 Claims, 5 Drawing Sheets

(56) References Cited

U.S. PATENT DOCUMENTS

| | | | |
|---|---|---|---|
| 2006/0236322 A1* | 10/2006 | Brackman | G06F 9/4806 718/103 |
| 2008/0189619 A1 | 8/2008 | Reed et al. | |
| 2008/0201227 A1 | 8/2008 | Bakewell et al. | |
| 2008/0269958 A1* | 10/2008 | Filev | B60W 50/10 701/1 |
| 2009/0046109 A1* | 2/2009 | Hamilton, II | G06F 3/04815 345/619 |
| 2009/0119604 A1* | 5/2009 | Simard | G06Q 10/10 715/757 |
| 2009/0147008 A1 | 6/2009 | Do et al. | |
| 2009/0158151 A1* | 6/2009 | Cheng | G06F 3/0482 715/706 |
| 2009/0177977 A1* | 7/2009 | Jones | G06N 3/006 715/753 |
| 2009/0208181 A1* | 8/2009 | Cottrell | A63F 13/497 386/278 |
| 2009/0241036 A1* | 9/2009 | Reisinger | A63F 13/10 715/757 |
| 2010/0005394 A1* | 1/2010 | Dubnov | G06F 9/4443 715/733 |

* cited by examiner

CREATION AND PRIORITIZATION OF MULTIPLE VIRTUAL UNIVERSE TELEPORTS IN RESPONSE TO AN EVENT

FIELD OF THE INVENTION

The present invention generally relates to the production and management of interactive virtual universes presented to users on computers linked by a network and, more particularly, to generation of and prioritization of teleportation invitations automatically based on execution of a process.

BACKGROUND OF THE INVENTION

Closely following the introduction of computer generated graphic representations of objects, computers games have been developed and have become popular to the point of becoming a significant industry. A significant factor in the continuing popularity of such games may possibly be the fact that the simulated venue or environment in which the game is played is limited only by the imagination of the game developer and can be presented to a viewer on a display with a realistic appearance which is limited only by the hardware and software employed to render associated images. Moreover, such simulated environments may be changed at will and very rapidly with rules of the game often being altered with the simulated environment. Connection of computers through networks such as the Internet have also allowed interactive participation in the same game simultaneously or at will by numerous participants.

As a synthesis of such games with other capabilities of the Internet such as interactive chat rooms, advertising and marketing and access to massive amounts of information and the like, so-called virtual universes (sometimes referred to as "metaverses" or "3D Internet") have been developed and made available to the public in recent years. A virtual universe (VU) is a computer-based simulated environment intended for users thereof (referred to as "residents" or "agents") to inhabit, traverse and interact through the use of avatars. An avatar, in the context of a VU, is a graphical representation of a user which has an appearance that is freely selectable that the user can control and other participants can see, often taking the form of a cartoon-like human which can move through the regions of the virtual universe represented by 3D graphics and landscapes. Such 3D graphics and virtual landscapes may or may not resemble the real world in terms of physical laws, building environments, geography and landscapes. Some examples of virtual universes available to the public include Second Life® ("Second Life" is a trademark of Linden Research, Inc. in the United States and/or other countries), Entropia Universe™ ("Entropia Universe" is a trademark of Mindark PE AB in Sweden and/or other countries), and There® ("There" is a trademark of Forterra Systems, Inc. in the United States and/or other countries). Examples of massively multiplayer online games include EverQuest® ("EverQuest" is a trademark of Sony Online Entertainment, LLC in the United States and/or other countries), Ultima Online® ("Ultima Online" is a trademark of Electronic Arts, Inc. in the United States and/or other countries) or World of Warcraft World of Warcraft® ("World of Warcraft" is a trademark of Blizzard Entertainment, Inc. in the United States and/or other countries). Publically available virtual universes and/or massively multiplayer online games are operated by persons or companies who provide servers to generate portions of the VU and which may impose a charge for participation as a resident, to establish a particular object or environment (sometimes referred to as an "island") within the VU, present advertising and the like or combinations thereof. In short, an avatar controlled by a resident can interact with other avatars, objects and portions of the immediate environment of the avatar in much the same way a person would interact with other persons, objects and portions of the environment in the real world but where transportation between portions of the VU may be nearly instantaneous (e.g. referred to as "teleporting") and objects and local environments within the VU may be entirely developed at will to resemble the real world closely, not at all or with any degree of realism or fantasy in between which may be provided by the administrator of the VU or users of the VU, often for a not insubstantial fee. Further, once such objects or local environments become part of a VU, fees can be charged for use made of them through avatars. On the other hand, many entities have found it advantageous to provide environments closely resembling real world facilities or locales to allow users to experience, though avatars and with a significant degree of realism, particular locales in the real world and a sampling of the likely inhabitants thereof.

SUMMARY OF THE INVENTION

It is therefore an object of the present invention to provide a system and method for issuing and prioritizing teleport invitations based upon process(es) to be executed rather than teleporting at the will of a resident or accepting teleportation invitations issued in the normal and known manner.

In order to accomplish these and other objects of the invention, a method is provided to perform, in a virtual universe, steps of receiving, at a location in the virtual universe, an indication of an event, determining a plurality of locations and tasks corresponding to the event, prioritizing the plurality of locations and tasks to form a prioritized list, and issuing teleportation invitations corresponding to the locations in sequence in accordance with a result of the prioritizing step.

In accordance with another aspect of the invention, a virtual universe system is provided including an arrangement for detecting an event in the virtual universe system, a resource table for indicating portions of the virtual universe related to the event, an arrangement for developing lists of tasks and locations based on portions of the virtual universe indicated to be related to said event by the resource table, priority logic for prioritizing entries in the lists forming a stack of prioritized locations and associated tasks, and an arrangement for outputting contents of said stack, in order as teleportation invitations.

In accordance with a further aspect of the invention, a method of responding to events using a virtual universe emulating real world persons and/or real world objects is provided comprising steps of generating lists of locations and corresponding tasks related to the event, prioritizing the lists into an ordered sequence of locations in the virtual universe, issuing teleportation invitations to an avatar in accordance with the ordered sequence of locations as tasks at said respective locations in the virtual universe are completed, and automating or otherwise facilitating tasks corresponding to the tasks performed at locations in the virtual universe or determining a solution to the event.

In accordance with yet another aspect of the invention, a computer program product is provided for forming a prioritized itinerary for teleportation of an avatar in a virtual universe, said computer program product comprising a computer readable medium or communication medium providing signals comprising a computer program; which computer program, when run on a data processor causes said data processor to perform steps of: receiving, at a location in said virtual universe, an indication of an event; determining a plurality of locations and tasks corresponding to said event; prioritizing said plurality of locations and tasks to form a prioritized list; and issuing teleportation invitations corresponding to said locations in sequence in accordance with a result of said prioritizing step.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED

Embodiment of the Invention

Figure 1:
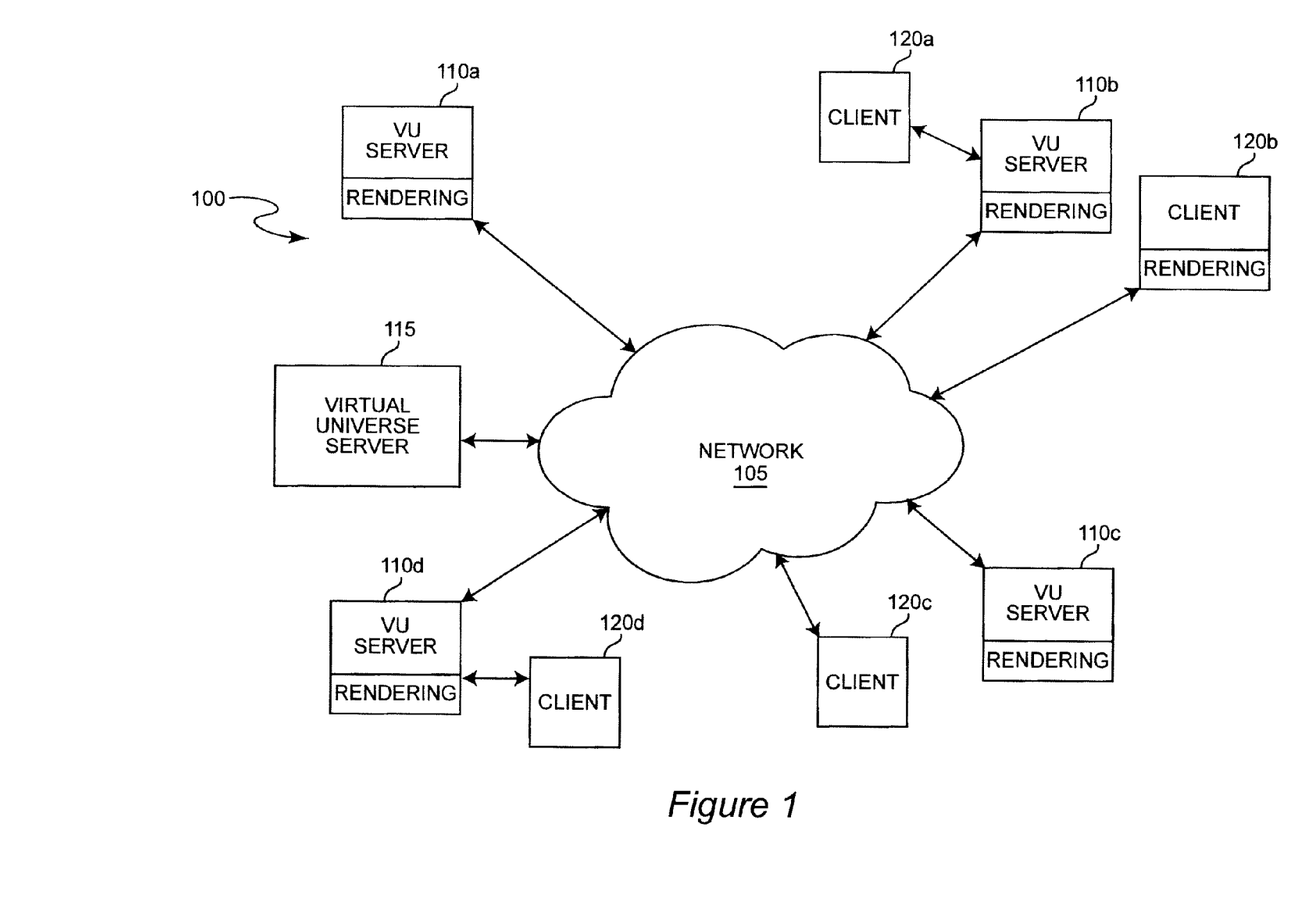
FIG. 1 is a high-level block diagram or data flow diagram of a network-based virtual universe.
Figure 2:
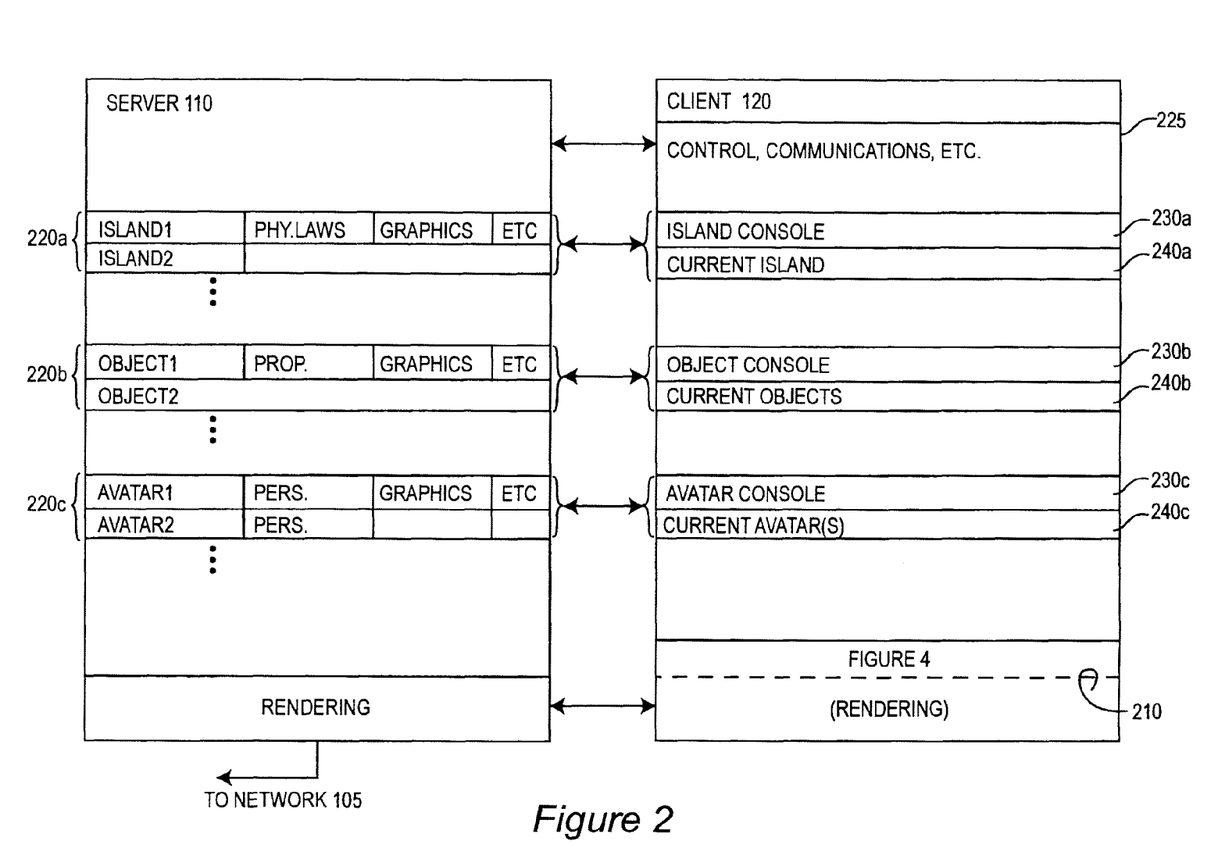
FIG. 2 is a high-level block diagram containing basic details of the relationship between a VU server and a VU client.

Referring now to the drawings, and more particularly to FIG. 1, there is shown a high-level diagram of a network implementing a virtual universe (VU). FIG. 2 is a similarly high-level block diagram illustrating functional relationships between a client terminal and a server implementing a VU and between which network 105 may of may not be interposed. FIGS. 1-2 are principally arranged to facilitate an understanding of the overall general operation of a virtual universe and do not and are not intended to represent any particular known implementation of a VU. Further, at the level of abstraction with which a VU is represented in FIGS. 1 and 2, the VU illustrated may or may not include the invention and no portion of FIG. 1 or 2 is admitted to be prior art in regard to the invention. It should also be borne in mind that VU implementations have become relatively sophisticated and the underlying technology relatively mature such that enhancements thereto, such as those provided by the present invention, must be interoperable with existing network and VU infrastructure.

It should also be recognized that operation of a VU is extremely processing intensive and, while large amounts of computing resources may be accessible through a network, graphics generation and rendering must be distributed and managed in such a way as to provide images of portions of the VU in a very short period of time in order to be acceptable to residents of the VU, particularly in regard to updating views as avatars are manipulated and as teleportation between islands of the VU occur. Further, substantial portions of the control of avatars must be automated in order to keep the manipulation effort required of a resident within reasonable bounds while providing meaningful and reasonably logical and realistic interactions with environments, objects and other avatars. Thus, each environment/island, object and avatar must be personalized (e.g. have a personality, properties, including ownership and the like) as well as many properties and attributes (e.g. behaviors and defaults) which must be transmitted efficiently, generally as metadata, between potentially a large number of processors which perform the rendering thereof and the rendering distributed in some form to the terminals through which residents interact with the VU.

Figure 5:
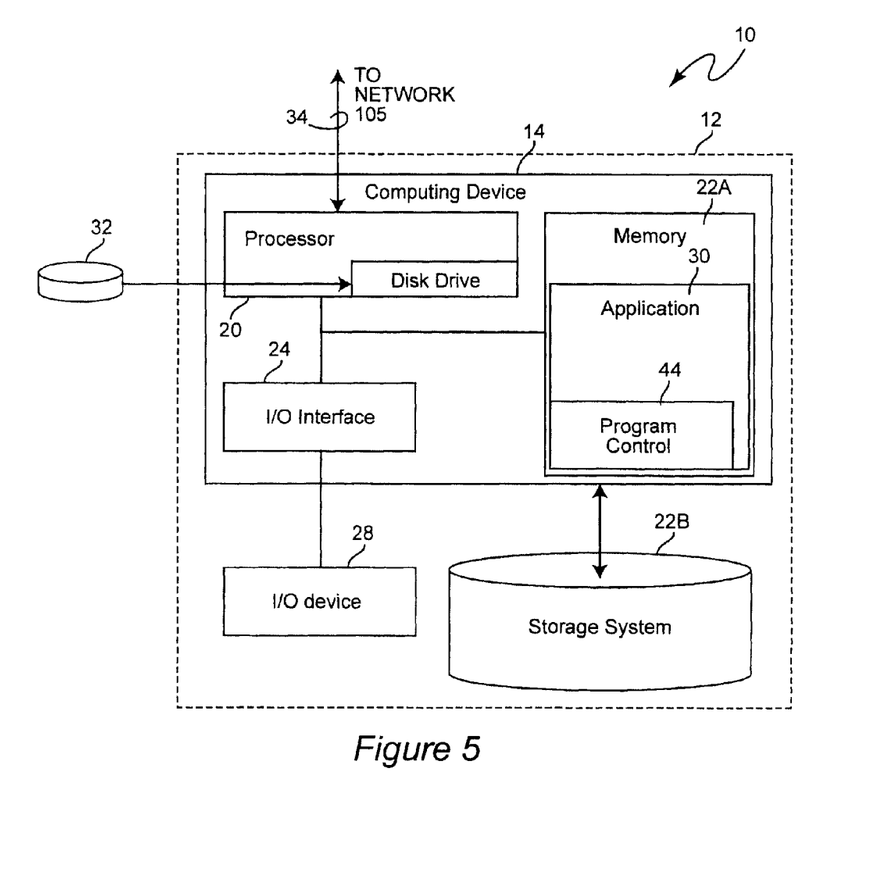
FIG. 5 illustrates a suitable processor architecture for use as a server or client in FIG. 1.

More specifically, as illustrated in FIG. 1, the overall network and system 100 will be recognized as substantially the same as that of the Internet. Other functional elements such as firewalls, proxies and the like may be included for purposes of security, reliability and the like but are not important to the successful practice of the invention. Network 105, such as the Internet, provides communications between all VU servers 110a-110b and at least one virtual universe server 115 which establishes the basic VU topology, characteristics, rules and the like and maintains membership and billing information in regard to residents (users). Clients 120a-120d are essentially user terminals and may communicate with the network 105 and VU server 115 either directly or through a VU server although that distinction is unimportant to the practice of the invention, as well. A suitable processor architecture is illustrated in FIG. 5 and discussed below In the following discussion, the term "rendering" will be used to denote the entirety of processing performed on the definitions of landscapes, environmental features, avatars and/or objects as contained in metadata in order to produce signals which can be used to drive a display to produce a graphical image. Such processing will, for example, include projection of the location of an object in the virtual environment to a location in a two-dimensional representation from a particular viewing point, positioning and orienting geometric coordinates of graphic primitives approximating environment features, objects or avatars or parts thereof, making hidden line calculations, generating surface textures, generating lighting and shading effects and their interactions between objects and the like to construct a scene and, as such, constitutes a substantial processing burden. As a practical matter in view of current communications bandwidth constraints, distribution of processing power and storage over a network, hardware and software compatibility and issues of data transmission delays and latency, some aspects of scenes are usually constructed at a server and transmitted over the network as positions, graphics primitives and geometric coordinates (sometime referred to as a pre-image) while hidden line and surface computations, generation of textures, lighting and shading effects and the like for final image presentation (which are well-developed and routine processes that can be performed on relatively inexpensive hardware such as a graphics card) are generally performed on such hardware in a client processor. However, the location where the rendering process or portions thereof are performed is not important to the practice of the invention while the critical aspect of rendering for VU performance is the overall processing load the entire process imposes on a VU system, particularly when teleportation is performed.

Referring now also to FIG. 2 the nature of communications generally depicted in FIG. 1 will be explained in greater detail but also with a degree of generality since many variations thereof may be employed. It will be readily understood by those skilled in the art that rendering of islands, avatars, objects and the like is perhaps the most processing intensive aspect of a virtual universe as well as being the most time-critical for performance which is acceptable to the user. Hardware, software and firmware for performing a convenient portion of rendering is generally resident in each VU server 110 and the virtual universe server 115 of FIG. 1 but may be present to some degree (e.g. a graphics co-processor) at a client terminal 120 as depicted by dashed line 210 and parentheses in FIG. 2. In general, the servers 110, 115 will have the capability of arbitrating the most convenient or available location for the portion of the rendering performed on a server to be done most expeditiously. For example, when a rendering of a scene is required at, for example, client 120*a* for interaction of a particular avatar with an object while changing location on an island, the rendering (including occlusion or hidden line processing) could be performed at the client, local server 110*b* or distributed over any or all of servers 110*a*-110*d* And possibly even including some client terminals (e.g. 120*b*) having rendering capability depending on rendering complexity (e.g. required detail) and current processing loads of VU servers and clients. It should be appreciated that plural avatars for plural residents/users may be present in the same environment and that a different point of view may be required for the rendering presented to each resident/user.

Thus, the graphics to be presented to a user may be transmitted as a rendering or partial rendering to the network or a local client from a server (e.g. as primitives and geometric coordinates or even compressed video or graphics primitives which may or may not be further modified at a local server or client processor) or, if rendering of avatars, objects or islands resident on a particular server are to be performed on another processor, attributes such as the identity, physical laws, graphics definitions (e.g. primitives), etc. of an island, the identity, properties, graphics definitions, etc. of an object and/or personality, ratings, graphics definitions, etc. of an avatar are stored, preferably as metadata in servers 110 and transmitted as such to the processor which will actually perform the rendering and retransmission of the graphics. It should be appreciated that such attributes will be either constant or only infrequently or slowly changing and thus would be impractical and distracting to specify with each avatar command but can be automatically transmitted and retransmitted between servers automatically, as needed, with avatar commands, controls and/or communications specified by the user/resident.

It should also be appreciated that client 120 will have appropriate controls and communications facilities (which are not generally hardware-dependent but can use available hardware interfaces such as a keyboard, mouse, camera, microphone or the like) collectively depicted at 225 of FIG. 2 which will preferably be resident on the client processor.

In order to create islands, objects and avatars, some arrangement for doing so, preferably a graphic user interface (GUI) which may be in the form of one or more screens (possibly nested) functioning as a console 230*a*-230*c* may also be resident but are preferably downloaded from virtual universe server 115 through the local server. Such consoles allow particular attributes (e.g. locations, properties, personalities, graphics definitions and the like) to be specified and which are thereafter stored, preferably on an associated server 110 as depicted at 220*a*, 220*b* and 220*c* for islands, objects and avatars, respectively. Similar GUIs 240*a*-240*c* are also provided (but preferably resident on the client processor) for control of the current island, object and/or avatar, once it has been created. Suitable arrangements for providing GUIs or consoles 230*a*-230*c* and GUIs 240 are known and others providing enhanced user/resident convenience is foreseeable. The current island (220*a*) with its associated objects (220*b*) correspond to the current location of the current avatar (220*c*) and are thus the object of teleportation or relocation invitations to which the present invention is directed for management thereof as will now be discussed. Specifically, the invention provides for additional capabilities of the client processor of the avatar/resident to generate its own itinerary including prioritized teleports and associated tasks for carrying out a process in response to an event such as an alert or teleport request as will be described in detail in connection with FIG. 4.

Some definitions which will be helpful in the following discussion are:

1. Avatar—an avatar is a graphical representation the user/resident selects that others can see, often taking the form of a cartoon-like human but which can be produced with any degree of detail, whether real or fanciful;

2. Agent—an agent is the user's account, upon which the user/resident can build an avatar and which is tied to an inventory of assets the user creates and/or owns;

3. Region—a region is a virtual area of land (e.g. a portion of an island or an environment associated therewith, such as an interior space in a building) within the virtual universe which typically resides on a single server;

4. Landmarks—a landmark is a map location that can be saved by a user and typically comprises a name and a map coordinate within the VU;

5. Friend/contact—a friend or contact is another user/resident of the VU which is maintained in one or more lists which allows a user to see when friends or prior contacts are online and provides a mechanism for contacting them directly using tools available with the list. It should also be appreciated that assets, avatars, the environment corresponding to a location and anything else visible in the virtual environment comprises universally unique identifiers (UUIDs) tied to geometric data (preferably distributed to users as textual coordinates), textures (preferably distributed to users as graphics files such as JPEG 2000 files) and effects data (preferably rendered by the user's client according to the user's preferences and user's device capabilities but could be otherwise rendered as discussed above).

Virtual universes may be traversed by such methods as walking, flying or teleporting. Generally, walking and flying provide for traversal of areas within an island while teleporting provides a mechanism to travel rapidly from one VU location to another VU location even if the locations are geographically (e.g. in the context of the topology of a particular VU) far apart. As indicated above, a user can teleport to any other location of which he may be aware. However, since a major feature of virtual universes is to allow avatars of different users to interact as well as to increase user awareness of additional locations that may be of interest, one user may issue an invitation to another user in the foam of an offer of teleporting an avatar of the recipient from the current location of the recipient's avatar to another location. Known systems allow a recipient to accept or reject the invitation/offer of teleporting. If accepted, the avatar of the recipient is teleported from its current location to a location corresponding to the invitation/offer.

As virtual universes have developed and additional useful applications found for them, many locations or islands have been created to simulate or emulate a real world environment even if the "real world" environment is a representation of a virtual environment. That is, the virtual environment may emulate a "real world" environment which does not, in fact, exist but is configured to be symbolic of one or more facilities or regions in which useful work may be done or services performed by an avatar in the manner of a real person in a real facility. Thus, the avatar can perform useful functions or work that may be used to automate or otherwise facilitate similar actions in the real world environment which the VU emulates such as a real world data center or a hospital. Such a real world data center may include representations of various real or virtual hardware or software objects, rack space, applications, networks and management capabilities and their interconnections. An emulated hospital would allow a doctor to make "rounds" of visitations to patients and performance of other functions such as establishing orders for patient care; each at corresponding locations. The objects (or possibly avatars) representing equipment, software, patients or the like may correspond to real world entities, be spread over a wide area and representations thereof in the VU may be realistic, unrealistic, symbolic or express any degree or combination of any such representational techniques. Also, it should be appreciated that a VU data center which will be principally alluded to in the following description of the invention, is, in many ways, representative of or shares many characteristics with many other environments (such as a hospital) to which the invention may be advantageously applied.

In known virtual universes, an avatar may teleport to any location of which the corresponding resident is aware or may receive an invitation from any participant in the VU to teleport to a particular location which the resident or avatar may then accept or reject. However, when an avatar is called upon to perform some task or plurality of tasks, it may not be immediately clear to the avatar (or known to a resident) the location or sequence of locations the avatar should visit in order to complete the task(s) or the order in which locations should be visited in order to efficiently do so.

In the preferred embodiment of the invention through which its principles of operation and constitution will be described, representations are preferably representations of actual, traditional facilities as they exist in the real world. For example, data centers typically will have equipment installed in rows, separated by aisles in a large room. However, regardless of the environment represented, some objects therein may, in fact, be virtual objects or machines which may be visualized as packages of operating systems, applications and frameworks which may be accessed for particular functions but may not physically exist in a given real world location.

An example of an environment principally comprising virtual machines would be the Amazon EC2 system which allows use of web service interfaces to requisition machines or other resources for use, loading them with custom application environments managing the network's access permissions and running the applications or images using as many or as few machines and resources as may be desired, in which case, the VU representation would be less directly a mapping between physical machines and locations in a data center but more of a mapping of virtual machines to a VU representation. That is, a virtual machine in the real world could be represented as a "real" machine in the VU.

It should be noted in this regard that a data center or other facility may exist "strictly" within the virtual world, for example, if it was set up by an avatar for use by other avatars within the VU and with no regard to the actual machine underpinning of devices and software needed to run the VU data center. Conceptually in such a representation, the VU data center is still important for users attempting to run tasks and obtain results or to perform various forms of "triage" (establishing a priority between tasks presenting different degrees of urgency) as will be described below.

To better visualize the problem which is addressed by the invention, consider that a system administrator may be responsible for the operation of key applications and/or services provided by the data center or other facility. To do so, the system administrator must quickly execute processes to maintain the data center which may include diagnosing of incidents and other alerts that are generated within the data center (much in the manner of a doctor on duty within a hospital is required to respond to emergencies). The initial problem for the system administrator (or doctor) is to determine the location to which the system administrator (or doctor) should first teleport to execute a specific process. For example, an alert may be generated that one or more particular applications are not working while the process of diagnosing the application(s) may involve understanding which object or objects within the data center may not be functioning properly and which malfunctions of applications, devices or a combination thereof may be related. To efficiently respond and restore proper functionality, the present invention creates and prioritizes a list of destinations within the data center or other facility to which the administrator should teleport and associated tasks to be performed at each location and generates prioritized teleportation invitations for the system administrator's use and convenience. The present invention may also be applied across a plurality of data centers and/or other facilities so that an administrator and/or support personnel can teleport to an ordered sequence of destinations (e.g. a disk drive in data center 1 and a tape drive in data center 2) in an optimal manner.

As an example, consider the circumstance in which a system administrator is responsible for an application which runs on two pieces of hardware, three pieces of software and a shared storage system and an alert is issued indicating that the application is not functioning properly. The administrator is responsible for diagnosing the cause of the malfunction which involves inspection of both pieces of hardware, the three pieces of software and the storage system. The invention, in a manner which will be discussed in greater detail below, generates a prioritized list (or a plurality thereof) of teleport locations for the system administrator (and possibly support personnel which may have different respective lists provided by the present invention) to which the system administrator (and support personnel) can teleport. The system administrator list, for example, may first provide for teleportation to the location in the data center which represents the hardware involved in the application (which may also be prioritized between the individual devices on which the application is run) and issues teleport invitation(s) to corresponding location(s). The system administrator accepts the invitation(s) and teleport(s) and, finding no problem can then teleport to the next location in accordance with the next invitation in the prioritized list and teleports, for example, to the storage system where an error or malfunction is found. The system administrator can then correct the error or malfunction and (refusing intervening teleport invitations) transports to a configuration management location where the system administrator can document the (now) known solution to the problem.

In real data centers, there is often a list of outstanding alerts, some of which are of low priority and do not represent a current malfunction, such as a slow response time which is still within nominal tolerances or an alert for periodic maintenance for which the performance date may extend over a substantial length of time. Such non-critical alerts may be addressed only infrequently such as quarterly shut down times. The invention allows these alerts to be maintained with other urgent alerts that must be addressed in substantially real time so that they can be dealt with as the opportunity (e.g. between critical malfunctions) arises. Further, in real data centers, high criticality alerts may be issued before older, possibly less critical, alerts are fully resolved. Accordingly, the invention preferably provides for dynamic adjustment of teleportation priorities when higher priority alerts occur or when an emergency teleport is required if, for example, a location must be examined before the next planned teleport is executed as well as providing for avatar input. Because system administrators gain experience over time, the ability for a system administrator or the corresponding avatar to work in conjunction with a prioritized list developed in accordance with the basic functions of the present invention can increase the utility and efficiency of the operation of the invention. Also, documentation of learned solutions to problems essentially allows the prioritization system of the invention to "learn" from solutions which have previously been found by the system administrator or his predecessors.

Figure 3:
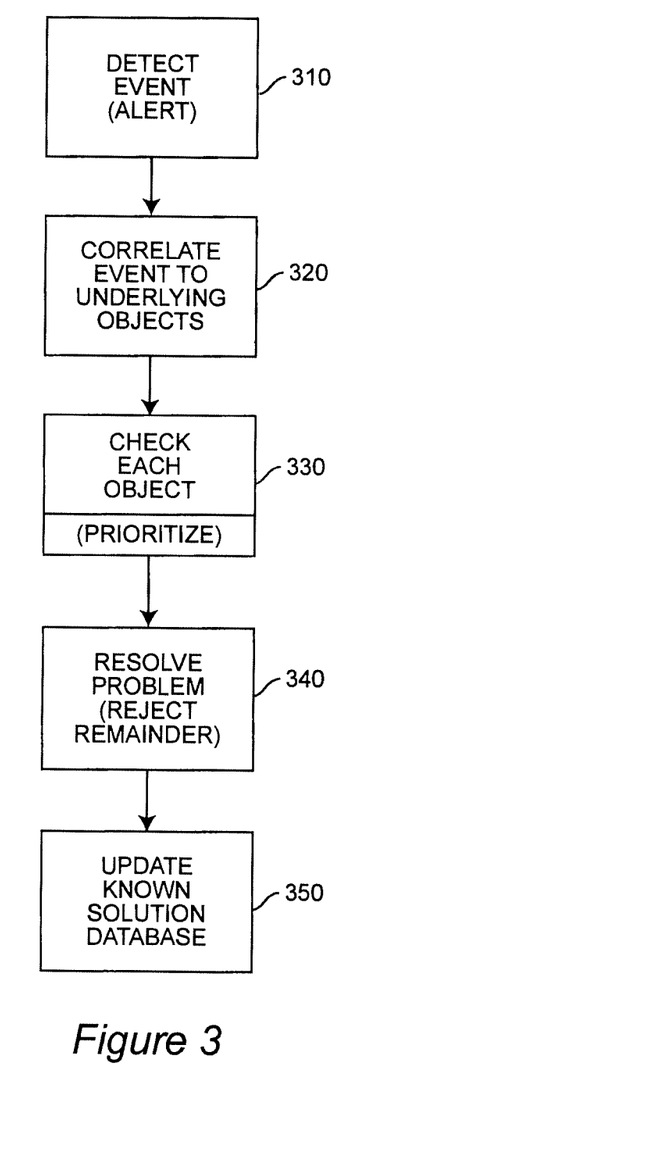
FIG. 3 is a basic flow diagram of the operations performed by the invention.
Figure 4:
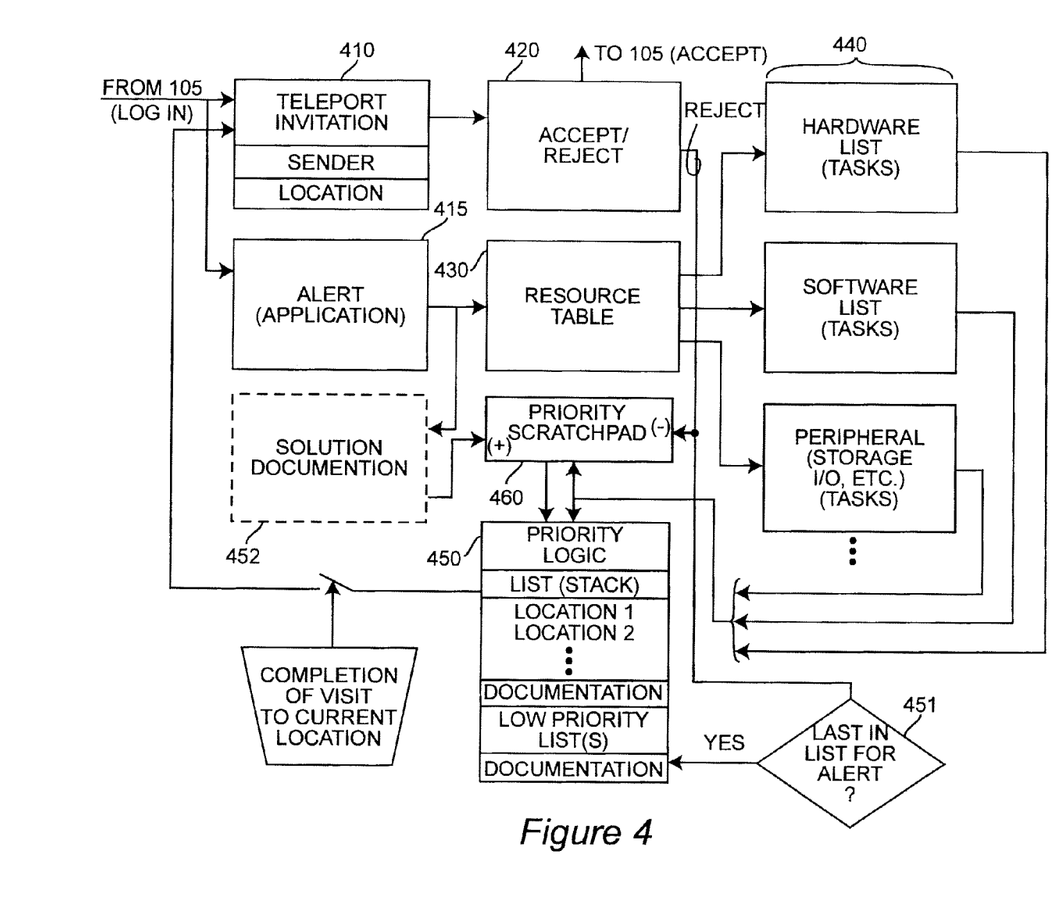
FIG. 4 is a high-level block diagram (which can also be understood as an information flow diagram) of a preferred architecture for providing the functionalities of the present invention and which represents additional mechanisms with which the basic flow diagram of FIG. 3 is refined as experience is collected through use of the present invention.

The manner in which the present invention accomplishes these meritorious functions will now be described with reference to FIGS. 3 and 4. FIG. 3 is a basic flow chart which represents basic operations performed by the present invention. It should be understood that these basic steps are performed in a most rudimentary form before experience with a system represented in the VU is obtained while variation of these basic steps will reflect the collection of such experience in accordance with the preferred embodiment of the invention in regard to particular applications in accordance with the illustration of system architecture in FIG. 4 which can also be understood as a data flow diagram for the preferred embodiment of the present invention. It should also be understood that the functional elements and method steps illustrated in FIGS. 3 and 4 are preferably implemented in software that may be embodied as a computer program product storing or communicating signals on a machine readable or communications medium, respectively and which program signals, when run on a data processor, cause that data processor to be configured into functional elements (e.g., as in FIG. 4) and/or to perform certain functions as steps of a method (e.g., as in FIG. 3).

The process in accordance with the invention generally begins with the detection of an event 310, generally indicated by the issuance of an alert for the data center or other facility represented by an island of the VU. The alert will preferably include some identifiers which at least generally categorize the event; generally (in the case of a data center or the like) identifying an application since most applications include the capability of issuing their own alerts. The alert may be communicated using either the VU (e.g. as a teleport call) or some other medium such as e-mail, any or all of which are intended to be collectively illustrated by input "from 105" of FIG. 4. Particularly if the alert is received as a teleport call, it is preferably stored, at least temporarily, at 410 (e.g. using the application name as a teleport destination location or inviting agent—the application or agent may, in fact, be a location in the VU) since 410 is generally provided as an incident of normally handling teleport invitations in known virtual universes. If the teleport call is not a system alert but a normal teleport invitation, the current avatar or resident to whom the invitation is directed can accept or reject that invitation at 420 in a known manner. Use of the same or similar facility in accordance with the invention assures interoperability of several aspects of the present invention with known VU systems.

The next step 320 in the process of the invention is to correlate the identification of the alert or event with underlying objects such as the particular resources of the data center on which an application identified by the alert may be run. This function is preferably achieved by detecting the alert as such at 415 which may, for example, recognize the identifier as coinciding with an application in the data center or some similar logical comparison. This identification is then conveyed to, for example, a resource table 430 containing a list of the resources designated for use by the application. Resource table 430 then outputs a plurality of lists 440 which may comprise (for an application alert) a hardware list, a software list, and a peripheral list (e.g. storage, input/output device(s) and the like). (For a hospital environment as alluded to above, the lists might include a patient list for the patient, room or ward issuing the alert, equipment associated with the patient, room or ward, and the data being produced by such equipment (e.g. EEG, EKG, heart rate/respiration data, medication monitors, etc.) and the like.) These lists may provide an initial basis for prioritizing teleportation locations in that the average malfunction rates or severity of a condition may differ between the type of objects in each respective list. For example, storage devices may malfunction more frequently than software while hardware malfunctions may occur with lowest frequency. (Likewise an abnormal change EKG output can indicate a more critical condition than variation in body temperature of a patient.) These lists are then provided to priority logic 450 and priority scratchpad 460 or placed in a searchable data structure or search tree with weights applied to them and updated over the course of time as experience is acquired.

Priority logic 450 also receives input from priority scratchpad 460 which manages data in the lists 440. For example, the total data from all lists corresponding to a given alert are associated in the scratchpad 460 or other searchable data structure which thus can assure that each object is checked as indicated at step 330 of FIG. 3 unless rejected by the system administrator. Priority scratchpad 460 can also accumulate the results of a solution being found in a particular list 440 and/or in a particular object within any list or, conversely, the number of times a solution was found before a given object with a given priority is reached and correlate such results with a given event. This accumulated data may be used to refine priority estimates as indicated by the (+) and (−) inputs to priority scratchpad 460. As this data regarding the discovery of solutions is accumulated priority scratchpad determines a priority of each object as it is entered into a location stack within priority logic 450. Based on much the same data, priority scratchpad 460 can determine if a search through all objects corresponding to a given alert has been completed even when other alerts may generate additional lists with object of greater or lesser priority prior to completion of investigation and correction of a given alert.

Priority logic 450 preferably operates in a manner similar to a stack in which data may be entered at any location within a stack, forcing lesser priority objects and locations lower in the priority stack. The contents of the stack are then output in order as teleport invitations except for a documentation location which may be output from the stack selectively whenever a solution and remediation for a given alert is discovered as will be discussed in greater detail below. It should be noted that the priority stack will also likely contain one or more low-priority lists of objects which may be output in due course when they reach the top of the stack in order to prompt performance of low priority work on the system as the opportunity to do so occurs, as alluded to above. The output of the stack is then fed back to 410 as a teleportation invitation as work or other activity at the prior teleportation destination is completed. It is important to note in this regard that the user may accept or reject the next teleport invitation, so generated, for purposes of changing order of teleport destinations whereupon the teleport invitations from the prioritized list may be resumed or, if a solution is found before all locations in the prioritized list have been visited, the remainder of the locations in the prioritized list can be iteratively rejected. Upon rejection of the last teleportation invitation in the list as detected at 451, the documentation location teleport invitation is issued. A similar invitation is normally provided as a last location in the prioritized list corresponding to an alert and is reached in the normal course of operation.

It is important to an appreciation of the invention to understand that, contrary to the handling of teleportation invitations in known virtual universes, the teleportation invitations thus made available to the avatar/resident are locally generated and prioritized in accordance with a locally stored process which may be locally refined through use of the invention in response to an alert from another or even the same location within the VU which, for purposes of interoperability, is or can be initially handled in the manner of an invitation but then discarded and replaced by the sequence of locally generated invitations specifically directed to diagnosis and remediation of the alert whereas teleportation invitations in known VU systems are generated by other users associated with the VU, generally from remote locations in the VU. Further, it should be appreciated that while the lists 440 are exhaustive of possible fault locations, as initially generated, the avatar/resident to whom the alert is directed can reject some of the invitations in the prioritized list to refine the prioritization based on experience with the system and can reject all invitations in the prioritized list once the location of the problem has been discovered and resolved as illustrated at 340 of FIG. 3. The avatar is then directed by a further invitation in response, for example, to an invitation rejection or an input indicating the effecting of a solution (as detected at 451) to a location 452 for documenting the particulars or details of the problem and solution, as illustrated at 350 of FIG. 3, while the locations at which the solution is found and the invitations rejected as being thereafter unnecessary are monitored to allow the prioritization to be adaptive and used in conjunction with documented known solutions such that the priority scratchpad 460 and priority logic 450 are maintained to provide a prioritization of lists 440 to be as near as possible to the optimum priority for discovery of a solution.

In this regard, it is possible that identical alerts at different times will require different solutions or that solutions will be discovered at different locations in different instances of identical alerts. However, compilation of statistics concerning the solutions discovered and locations to which teleportation was found unnecessary in the course thereof will allow prioritization that will allow location of problems with the lowest number of teleportations and in the shortest time for most alerts.

Also, it should be recognized that before significant "learning" by the system through the data collection mechanism discussed above has taken place through use of the invention, the priority, at least between but preferably also within lists 440, can be based on virtually any experience-based data that may exist from similar or even radically different systems, recency of implementation or repair at particular locations, proximity of proposed teleport locations or even based on substantially arbitrary (e.g. alphabetical or numerical designations or even locations which are empty or with the lowest or greatest current populations of avatars). Also, it should be appreciated that, as each invitation is accepted, only the next need be generated and then only when operations at the current location is completed. Thus, if a higher priority or emergency alert or interrupt is received, the system can re-prioritize and modify the intended teleportation plan at any time. By the same token, the user can add or delete teleport locations having any desired priority to the list at any time.

The above description of the constitution and operation of the preferred embodiment of the invention has been referenced to an application to a virtual data center. It should be understood, however, that some variation of operation may be appropriate to other applications as will now be illustrated with reference to an application making patient rounds in a virtual hospital. For example, a doctor may have a simple process to execute each day to check on the health of all patients under the care of the doctor but may also have responsibility for responding to certain types of emergencies. The avatars representing the patients may be in different locations within the virtual world and each patient avatar or location may be associated with objects providing sources of medical information (e.g. charts, medical monitors and the like). In such a case, entrance on duty (e.g. completion and acknowledgment of log in) of the doctor serves as the initiating event the system in a manner similar to an alert alluded to above, whereupon the system locates the patients and places the locations in a teleport list (with associated object lists) for the doctor while analyzing inputs in regard to each patient and associated objects to establish a priority among the patients based on information (e.g. real-time and historical monitored data and patient avatar metadata) such as but not limited to co-location of patients (e.g. to minimize teleport time and processing) which can also be performed in the exemplary data center application or other applications where, for example, several or all of the entities in a list, such as all hardware, are co-located) and do not require separate teleports. Co-location can preferably be indicated and implemented by placing tags on entities in the lists, causing plural indicated but common locations to be collapsed into a single teleport while generating a list for the avatar of functions to be performed at that location, changes or fluctuations in monitored data for respective patients, elapsed time since the last doctor visit, relative severity of illness or condition, total service charges to date (e.g. to minimize patient costs) or personal preferences of the doctor (e.g. in regard to anticipated difficulty or duration of a visit). Once the priority is established, emergencies such as additional alerts can cause re-prioritizing of the patient list as in the above description of the invention. In this application, teleport invitations sequentially generated are not refused or generally used in regard to adaptive learning or optimization of priority. In general, it will also be desirable to provide a teleportation for documentation for each location if not for each patient (although some documentation may be managed by objects) and such documentation can track some priority-related results such as a patient's more favorable response to a particular visitation time.

Thus, regardless of application, the high-level steps employed in the present invention are:

1. a list of processes to be executed by the avatar are entered into the system comprising a series of activities and tasks that should be executed by an avatar in response to a particular condition such as an alert or emergency;

2. each activity is tagged as to whether teleportation is required from a present location or not, preferably with a display of activities to be performed at a given location;

3. a list of required teleportations is formed and prioritized;

4. the list of teleport destinations is maintained, dynamically updated as new higher priority or emergency tasks arise or as may be entered by a user and issued in order as teleportation invitations upon completion of activities at any given location; and 5. optionally but preferably, historical information and possibly user input (e.g. solution documentation) is accumulated to allow the system to adaptively alter prioritization criteria and parameters.

In view of the foregoing, it is seen that the system and method of the present invention provides for a teleport itinerary to be created in response to a particular condition and optimized in accordance with an application before presenting the itinerary to a potential user or group of users thereof. In addition to the exemplary applications discussed above, the invention also has application to addressing emergencies or undesirable conditions in virtually any real world environment (e.g. stores, power plants, material storage facilities and the like), addressing problems in transportation facilities and infrastructure, addressing human resources problems or providing service assistance or in any other environment where a plurality of problems may be encountered concurrently or where any problem may require evaluation and/or remediation at a plurality of locations. A proposed prioritization can be optionally modified by a user. As further perfecting features of the invention described above, displays such as display of the itinerary on a map and possibly indicating proposed or user-modified priority of sites and or progress though the itinerary of inventory of sites or objects to be visited may be provided. Because of variation in teleport time in a VU, recent data regarding teleport time may also be included among parameters on which priority is based. Further, if an itinerary is discovered to be of excessive length for a single avatar, the system may be configured, in accordance with its general principles, to divide the itinerary among a plurality of avatars in any of a number of relatively simple ways, such as merely directing some or selected invitations to one or more additional available avatars. Implementation of any of these variants of the invention will be evident to those skilled in the art in view of the above description of the invention.

While shown and described herein as a method and a system, it is understood that the invention further provides various alternative embodiments. For example, in one embodiment shown in FIG. 5, the invention provides a computer-readable/useable medium 22B that includes computer program code to enable a computer infrastructure to automatically manage teleportation movements between locations in virtual environments while determining suitability of requested destinations. To this extent, the computer-readable/useable medium includes program code that implements each of the various process steps of the invention.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc., collectively depicted at 32), or on one or more data storage portions of a computing device, such as the memory 22A and/or the storage system 22B (e.g., a fixed disk, a read-only memory, a random access memory, a cache memory, etc.), and/or as a data signal 34 (e.g., a propagated signal) traveling over a network 105 as depicted in FIG. 1 (e.g., during a wired/wireless electronic distribution of the program code).

Still yet, computer infrastructure 10 is intended to demonstrate that some or all of the components of implementation could be deployed, managed, serviced, etc. by a service provider who offers to implement, deploy, and/or perform the functions of the present invention for automatically managing teleportation movements between locations in virtual environments while determining suitability of requested destinations, for example by licensing methods and browser or application server technology according to the present invention to an internet service providers (ISP) or cellular telephone provider. In one embodiment the invention may comprise a business method that performs the process steps of the invention on a subscription, advertising, and/or fee basis. Thus a service provider can create, maintain, support, etc., a computer infrastructure 12 including computing device 14, such as the computer infrastructure 10 that performs the process steps of the invention for automatically manage teleportation movements between locations in virtual environments while determining suitability of requested destinations, and in return the service provider can receive payment from the customer(s) under a subscription and/or fee agreement and/or the service provider can receive payment from the sale of advertising content to one or more third parties.

As used herein, it is understood that the terms "program code" and "computer program code" are synonymous and mean any expression, in any language, code or notation, of an application 30 comprising a set of instructions including program control 44 intended to cause a computing device 20 having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver 24 for a particular computing and/or I/O device 28, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

While the invention has been described in terms of a single preferred embodiment, those skilled in the art will recognize that the invention can be practiced with modification within the spirit and scope of the appended claims.

What is claimed is:

1. A method of operating a virtual universe system on a plurality of networked data processors to provide a service, said method comprising configuring at least one data processor of said plurality of data processors to provide
    attributes of an environment and objects and/or avatars therein from which a representation of that environment, objects and/or avatars can be established in said virtual universe and rendered for display to a user;
    an alert detector to detect an event in said virtual universe system;

a resource table for indicating portions of said environment related to said event;
one or more lists of tasks corresponding to locations based on portions of said environment indicated to be related to said event by said resource table;
priority logic for prioritizing entries in said lists forming a stack of prioritized locations and associated tasks at respective said locations in accordance with said event; and
a stack output to output contents of said stack, in order, as teleportation invitations.

2. The method as recited in claim 1, wherein said environment is a real world environment.

3. The method as recited in claim 1, wherein said environment is a virtual environment.

4. The method as recited in claim 1, wherein said environment is a data center.

5. The method as recited in claim 1, wherein said environment is a hospital.

6. The method as recited in claim 1, wherein said prioritizing is adaptively altered based on determination of solutions to respective events.

7. The method as recited in claim 1 further including configuring said one or more computers to provide modification of a result of said prioritizing step in response to a further event.

8. The method as recited in claim 7, further including configuring said one or more computers to provide for a user to reject a said teleportation invitation from said prioritized list based on user input.

9. The method as recited in claim 1, further including configuring said one or more computers to provide collection of information regarding said tasks and locations which complete a resolution of said event, and
correlating said information collected in said collecting step with said event.

10. The method as recited in claim 9, wherein said prioritizing is adaptively altered based on said correlation of said collected data and said event.

11. The method as recited in claim 9, further including configuring said one or more computers to provide detection of a last task and location in said prioritized list and wherein said collecting is performed in response to said detecting.

12. A method of forming a prioritized itinerary for teleportation of an avatar in a virtual universe in response to an event, said method comprising:
providing attributes of an environment and objects and/or avatars therein from which a representation of that environment, objects and/or avatars can be established in said virtual universe and rendered for display to a user;
receiving, at a location in said environment, an indication of an event;
determining a plurality of locations in said environment and one or more tasks which correspond to said event at respective locations of said plurality of locations in said environment;
prioritizing said plurality of locations and tasks at respective locations of said plurality of locations in accordance with said event to form a prioritized list of said locations as said prioritized itinerary; and
issuing teleportation invitations corresponding to said locations in sequence in accordance with a result of said prioritizing step.

13. The method as recited in claim 12 further including modifying a result of said prioritizing step in response to a further event.

14. The method as recited in claim 12, further including collecting information regarding said tasks and locations which complete a resolution of said event, and
correlating said information collected in said collecting step with said event.

15. The method as recited in claim 14, wherein said prioritizing is adaptively altered based on said correlation of said collected data and said event.

16. The method as recited in claim 14, further including detecting the last task and location in said prioritized list and wherein said collecting is performed in response to said detecting.

17. The method as recited in claim 12, further including rejecting a said teleportation invitation from said prioritized list based on user input.

18. A computer program product for forming a prioritized itinerary for teleportation of an avatar in a virtual universe in response to an event, said computer program product comprising a computer readable medium storing non-transitory signals comprising a computer program; which computer program, when run on a data processor, causes said data processor to perform steps of:
providing attributes of an environment and objects and/or avatars therein from which a representation of that environment, objects and/or avatars can be established in said virtual universe and rendered for display to a user;
receiving, at a location in said environment, an indication of an event;
determining a plurality of locations in said environment and one or more tasks which correspond to said event at respective locations of said plurality of said locations in said environment;
prioritizing said plurality of locations and tasks at respective locations of said plurality of locations in accordance with said event to form a prioritized list of said locations as said prioritized itinerary; and
issuing teleportation invitations corresponding to said locations in sequence in accordance with a result of said prioritizing step.

19. The computer program product as recited in claim 18, wherein said signals further provide:
modifying a result of said prioritizing step in response to a further event.

20. The computer program product as recited in claim 18, wherein said signals further provide:
collecting information regarding said tasks and locations which complete a resolution of said event; and
correlating said information collected in said collecting step with said event.

* * * * *